US012592332B2

(12) United States Patent
Brittles

(10) Patent No.: US 12,592,332 B2
(45) Date of Patent: Mar. 31, 2026

(54) HTS LINKED PARTIAL INSULATION FOR HTS FIELD COILS

(71) Applicant: Tokamak Energy Ltd, Abingdon (GB)

(72) Inventor: Greg Brittles, Abingdon (GB)

(73) Assignee: Tokamak Energy Ltd, Abingdon (GB)

( * ) Notice: Subject to any disclaimer, the term of this patent is extended or adjusted under 35 U.S.C. 154(b) by 944 days.

(21) Appl. No.: 17/786,497

(22) PCT Filed: Dec. 15, 2020

(86) PCT No.: PCT/EP2020/086112
§ 371 (c)(1),
(2) Date: Jun. 16, 2022

(87) PCT Pub. No.: WO2021/122522
PCT Pub. Date: Jun. 24, 2021

(65) Prior Publication Data

US 2023/0010097 A1 Jan. 12, 2023

(30) Foreign Application Priority Data

Dec. 20, 2019 (GB) ..................................... 1919030

(51) Int. Cl.
*H01F 6/02* (2006.01)
*H01F 6/06* (2006.01)
*H01F 27/32* (2006.01)

(52) U.S. Cl.
CPC ................. *H01F 6/02* (2013.01); *H01F 6/06* (2013.01); *H01F 27/323* (2013.01)

(58) Field of Classification Search
CPC ............. H01F 6/02; H01F 6/06; H01F 27/323
See application file for complete search history.

(56) References Cited

U.S. PATENT DOCUMENTS 11,101,060 B2 * 8/2021 Slade ..................... G21B 1/057
2004/0251902 A1 * 12/2004 Takagi ............... G01R 33/3456 324/318

(Continued)

FOREIGN PATENT DOCUMENTS

CN 207124095 U 3/2018
CN 107949890 A 4/2018

(Continued)

OTHER PUBLICATIONS

United Kingdom Intellectual Property Office Search Report for Application No. GB1919030.5 dated Jun. 2, 2020 (4 pages).

(Continued)

*Primary Examiner* — Paul A Wartalowicz
(74) *Attorney, Agent, or Firm* — Michael Best & Friedrich LLP

(57) ABSTRACT

A high temperature superconducting, HTS, field coil. The HTS field coil comprises a plurality of turns comprising HTS material and metallic stabilizer; and a partially insulating layer separating the turns, such that current can be shared between turns via the partially insulating layer. The partially insulating layer comprises an insulating region, and a plurality of electrically conductive paths through the insulating region, wherein current can be shared between the turns via the electrically conductive paths. Each electrically conductive path comprises an HTS bridge comprising HTS material, wherein the HTS bridge is in series with normally conducting material of the electrically conductive path.

6 Claims, 8 Drawing Sheets

(56) References Cited

U.S. PATENT DOCUMENTS

| | | | |
|---|---|---|---|
| 2009/0286685 A1 | 11/2009 | Krämer et al. |
| 2018/0350494 A1 | 12/2018 | Iwai et al. |
| 2019/0267171 A1 | 8/2019 | Slade |

FOREIGN PATENT DOCUMENTS

| | | | |
|---|---|---|---|
| CN | 110494925 A | 11/2019 |
| DE | 10014197 A1 | 9/2001 |
| EP | 0667628 A1 | 8/1995 |
| EP | 3346475 A1 | 7/2018 |
| GB | 2578307 A | 5/2020 |
| JP | H11260628 A | 9/1999 |
| JP | 2016039289 A | 3/2016 |
| JP | 2017103352 A | 6/2017 |
| JP | 2018532262 A | 11/2018 |
| RU | 2686524 C1 | 4/2019 |
| RU | 2726323 C1 | 7/2020 |
| WO | 2013030554 A1 | 3/2013 |
| WO | 2018115818 A1 | 6/2018 |
| WO | 2019150123 A1 | 8/2019 |

OTHER PUBLICATIONS

International Search Report and Written Opinion for Application No. PCT/EP2020/086112 dated Apr. 1, 2021 (14 pages).

Japanese Patent Office Action for Application No. 2022-537315 dated Sep. 10, 2024 (9 pages including English machine translation).

Russian Patent Office Action for Application No. 2022119654/07 dated Feb. 13, 2024 (4 pages including English machine translation).

International Preliminary Report on Patentability for Application No. PCT/EP2020/086112 dated Jun. 30, 2022 (8 pages).

Chinese Patent Office Action for Application No. 202080087948.9 dated Apr. 12, 2025 (7 pages including partial English machine translation).

* cited by examiner

HTS LINKED PARTIAL INSULATION FOR HTS FIELD COILS

CROSS-REFERENCE TO RELATED APPLICATION(S)

This application is a national phase entry of PCT/EP2020/086112, filed on Dec. 15, 2020, which claims priority to GB 1919030.5, filed on Dec. 20, 2019, the entire contents of each of which are fully incorporated herein by reference.

FIELD OF THE INVENTION

The present invention relates to HTS field coils.

BACKGROUND

The challenge of producing fusion power is hugely complex. Many alternative devices apart from tokamaks have been proposed, though none have yet produced any results comparable with the best tokamaks currently operating such as JET.

World fusion research has entered a new phase after the beginning of the construction of ITER, the largest and most expensive (c15bn Euros) tokamak ever built. The successful route to a commercial fusion reactor demands long pulse, stable operation combined with the high efficiency required to make electricity production economic. These three conditions are especially difficult to achieve simultaneously, and the planned programme will require many years of experimental research on ITER and other fusion facilities, as well as theoretical and technological research. It is widely anticipated that a commercial fusion reactor developed through this route will not be built before 2050.

To obtain the fusion reactions required for economic power generation (i.e. much more power out than power in), the conventional tokamak has to be huge (as exemplified by ITER) so that the energy confinement time (which is roughly proportional to plasma volume) can be large enough so that the plasma can be hot enough for thermal fusion to occur.

WO 2013/030554 describes an alternative approach, involving the use of a compact spherical tokamak for use as a neutron source or energy source. The low aspect ratio plasma shape in a spherical tokamak improves the particle confinement time and allows net power generation in a much smaller machine. However, a small diameter central column is a necessity, which presents challenges for design of the plasma confinement magnet. High temperature superconductor (HTS) field coils are a promising technology for such magnets.

Another potential use of HTS field coils is in proton beam therapy devices. Proton beam therapy (PBT, also known as proton therapy) is a type of particle therapy used in the treatment of cancers (and other conditions which respond to radiotherapy). In PBT, a beam of protons is directed towards the treatment location (e.g. the tumour).

Another, similar therapy is proton boron capture therapy (PBCT), in which boron-11 is introduced to the target location, and a proton beam is used to initiate the $p+{}^{11}B \rightarrow 3\alpha$ reaction. The same apparatus can be used to provide proton beams for either PBT or PBCT.

The proton beams for PBT and PBCT are generated by particle accelerators such as a cyclotrons or linear accelerators. Accelerators typically used for PBT and PBCT typically produce protons with energies in the range of 60 to 250 MeV, with the most powerful currently operating facility having a maximum energy of 400 MeV.

There are, broadly speaking, two types of design for PBT devices which allow variation of the beam angle. In the first type of design, as illustrated in FIG. 1, the accelerator 3001 is mounted on a gantry 3002, which allows it to be rotated around the patient 3003 (usually about a horizontal axis). The patient is placed on a moveable bed 3004, which provides further degrees of freedom (e.g. translational motion and rotation about a vertical axis).

The second type of design is illustrated in FIG. 2. The accelerator 4001 is stationary, and the beam is directed to the patient via steering magnets 4002 (generally including both quadrupole and dipole magnets), at least some of which are located on a gantry 4003, such that the beam can be rotated around the patient 4004 (e.g. about a horizontal axis). The patient is placed on a moveable bed 4005.

Either design requires that the gantry hold electromagnets capable of steering protons at the beam energy, which could be as high as 400 MeV. This requires very high magnetic fields, and as such the use of HTS field coils can considerably reduce the mass and size of the electromagnets and the gantry needed to move them. HTS field coils may be used within the accelerator, quadrupole magnets of the steering magnets, or dipole magnets of the steering magnets.

Superconducting materials are typically divided into "high temperature superconductors" (HTS) and "low temperature superconductors" (LTS). LTS materials, such as Nb and NbTi, are metals or metal alloys whose superconductivity can be described by BCS theory. All low temperature superconductors have a critical temperature (the temperature above which the material cannot be superconducting even in zero magnetic field) below about 30K. The behaviour of HTS material is not described by BCS theory, and such materials may have critical temperatures above about 30K (though it should be noted that it is the physical differences in composition and superconducting operation, rather than the critical temperature, which define HTS and LTS material). The most commonly used HTS are "cuprate superconductors"—ceramics based on cuprates (compounds containing a copper oxide group), such as BSCCO, or ReBCO (where Re is a rare earth element, commonly Y or Gd). Other HTS materials include iron pnictides (e.g. FeAs and FeSe) and magnesium diborate ($MgB_2$).

ReBCO is typically manufactured as tapes, with a structure as shown in FIG. 3. Such tape 100 is generally approximately 100 microns thick, and includes a substrate 101 (typically electropolished hastelloy approximately 50 microns thick), on which is deposited by IBAD, magnetron sputtering, or another suitable technique a series of buffer layers known as the buffer stack 102, of approximate thickness 0.2 microns. An epitaxial ReBCO-HTS layer 103 (deposited by MOCVD or another suitable technique) overlays the buffer stack, and is typically 1 micron thick. A 1-2 micron silver layer 104 is deposited on the HTS layer by sputtering or another suitable technique, and a copper stabilizer layer 105 is deposited on the tape by electroplating or another suitable technique, which often completely encapsulates the tape.

The substrate 101 provides a mechanical backbone that can be fed through the manufacturing line and permit growth of subsequent layers. The buffer stack 102 is required to provide a biaxially textured crystalline template upon which to grow the HTS layer, and prevents chemical diffusion of elements from the substrate to the HTS which damage its superconducting properties. The silver layer 104 is required to provide a low resistance interface from the ReBCO to the stabiliser layer, and the stabiliser layer 105 provides an alternative current path in the event that any part of the ReBCO ceases superconducting (enters the "normal" state).

In addition, "exfoliated" HTS tape can be manufactured, which lacks a substrate and buffer stack, and instead has silver layers on both sides of the HTS layer. Tape which has a substrate will be referred to as "substrated" HTS tape.

HTS tapes may be arranged into HTS cables. An HTS cable comprises one or more HTS tapes, which are connected along their length via conductive material (normally copper). The HTS tapes may be stacked (i.e. arranged such that the HTS layers are parallel), or they may have some other arrangement of tapes, which may vary along the length of the cable. Notable special cases of HTS cables are single HTS tapes, and HTS pairs. HTS pairs comprise a pair of HTS tapes, arranged such that the HTS layers are parallel. Where substrated tape is used, HTS pairs may be type-0 (with the HTS layers facing each other), type-1 (with the HTS layer of one tape facing the substrate of the other), or type-2 (with the substrates facing each other). Cables comprising more than 2 tapes may arrange some or all of the tapes in HTS pairs. Stacked HTS tapes may comprise various arrangements of HTS pairs, most commonly either a stack of type-1 pairs or a stack of type-0 pairs and (or, equivalently, type-2 pairs). HTS cables may comprise a mix of substrated and exfoliated tape.

When describing coils in this document, the following terms will be used:

"HTS cable"—a cable comprising one or more HTS tapes. In this definition, a single HTS tape is an HTS cable.

"turn"—a section of HTS cable within a coil which encloses the inside of the coil (i.e. which can be modelled as a complete loop)

"arc"—a continuous length of the coil which is less than the whole field coil

"inner/outer radius"—the distance from the centre of the coil to the inside/outside of the HTS cables "inner/outer perimeter"—the distance measured around the inside/outside of the coil "thickness"—the radial depth of all of the turns of the coil, i.e. the difference between the inner and outer radius "critical current" ($I_C$)—the current at which the HTS would become normal, at a given temperature and external magnetic field (where HTS is considered to have "become normal" at a characteristic point of the superconducting transition, where the tape generates $E_0$ volts per metre. The choice of $E_0$ is arbitrary, but is usually taken to be 10 or 100 microvolts per metre.)

"critical temperature"—the temperature at which the HTS would become normal, at a given the magnetic field and current "peak critical temperature"—the temperature at which the HTS would become normal given no external magnetic field, and negligible current.

Broadly speaking, there are two types of construction for HTS field coils—by winding, or by assembling several sections. Wound coils, as shown in FIG. 4, are manufactured by wrapping an HTS cable 201 around a former 202 in a continuous spiral. The former is shaped to provide the required inner perimeter of the coil, and may be a structural part of the final wound coil, or may be removed after winding. Sectional coils, as shown schematically in FIG. 5, are composed of several sections 301, each of which may contain several cables or preformed busbars 311 and will form an arc of the overall coil. The sections are connected by joints 302 to form the complete coil. While the turns of the coils in FIGS. 2 and 3 are shown spaced apart for clarity, there will generally be material connecting the turns of the coil—e.g. they may be consolidated by potting with epoxy.

The coils may be "insulated"—having electrically insulating material between the turns of the coil, or "non insulated", where the turns of the coil are electrically connected radially, as well as along the cables (e.g. by connecting the copper stabiliser layers of the cables by soldering or by direct contact). Non-insulated coils are not suitable for large field coils, due to extremely high ramp-up times, and a tendency for quenches to result in the entire cross section of the coil becoming normal, before the energy from the magnet has dissipated significantly—resulting in all of the magnet energy being dumped into a small volume.

A middle ground option is a "partially insulated" coil, where the material between turns has resistance intermediate between that of a traditional conductor, e.g. a metal, and a that of a traditional insulator, such as ceramic or organic insulator, e.g. having a resistivity between 100 and $10^{15}$ times that of copper or between $10^{-6}$ and $10^{8}$ Ohm metre. Partial insulation may be achieved by the selection of materials with an appropriate resistivity, or by providing partially insulating structures, which provide the required resistance. Such structures are described in detail in WO 2019/150123 A1, which is incorporated herein by reference.

In the simplest case, as shown in FIGS. 6A and B, a partially insulating structure may be a metal strip 601, with an insulating layer 602 on each side, with each insulating layer having one or more windows 603 through which electrical contact can be made with the second insulating layer. By offsetting the windows on each side of the strip, and/or varying their size and spacing along the strip, the effective resistance per unit length of the partially insulating structure can be controlled (and even varied along the structure), by altering the path 610 which the current takes between the windows. If such a partially insulating structure is wound between the turns of a coil, in electrical contact with the HTS of both turns along their length (e.g. via their metal stabiliser layers), then a partially insulating coil can achieved with whatever turn-turn resistance is desired.

As a further example, shown in FIGS. 7A through C, a more complex structure may be provided. The structure comprises 5 layers within an insulating body 701—a first metal connection layer 711; an electrically conducting layer 730; and a second metal connection layer 712. The first and second metal connection layers are provided on the surface of the insulating body, and the electrically conducting layer is provided inside the insulating body and electrically connected to the connection layers by vias 702. The electrically conducting layer is divided into several regions, including lanes 703 which provide conductive paths between the two metal connection layers through the insulating body. This adds another means of control of the resistance of the layer, as the width and length of each "lane" will affect the resistance. One advantage of this is that the window spacing can be made tighter (i.e. smoothing out the resistance of the partially insulating layer), while compensating for the loss of resistance by extending the length of the lanes and/or reducing their width.

SUMMARY

According to a first aspect, there is provided a high temperature superconducting, HTS, field coil. The HTS field coil comprises a plurality of turns comprising HTS material and metallic stabilizer; and a partially insulating layer separating the turns, such that current can be shared between turns via the partially insulating layer. The partially insulating layer comprises an insulating region, and a plurality of electrically conductive paths through the insulating region, wherein current can be shared between the turns via the electrically conductive paths. Each electrically conductive path comprises an HTS bridge comprising HTS material, wherein the HTS bridge is in series with normally conducting material of the electrically conductive path.

Further embodiments are defined in claim 2 et seq.

DETAILED DESCRIPTION

While the partially insulating structures as described in the background are suitable for most coils, it has been found that in coils where some parts of the coil operate at a higher $I/I_C$ fraction than others, a localised hotspot can still occur. This hotspot does not occur in the place where the quench initially began, but instead in the part of the coil with the greatest $I/I_C$ fraction. To explain why this occurs, it is first helpful to explain what happens during a quench in a partially insulating field coil.

Figure 8:
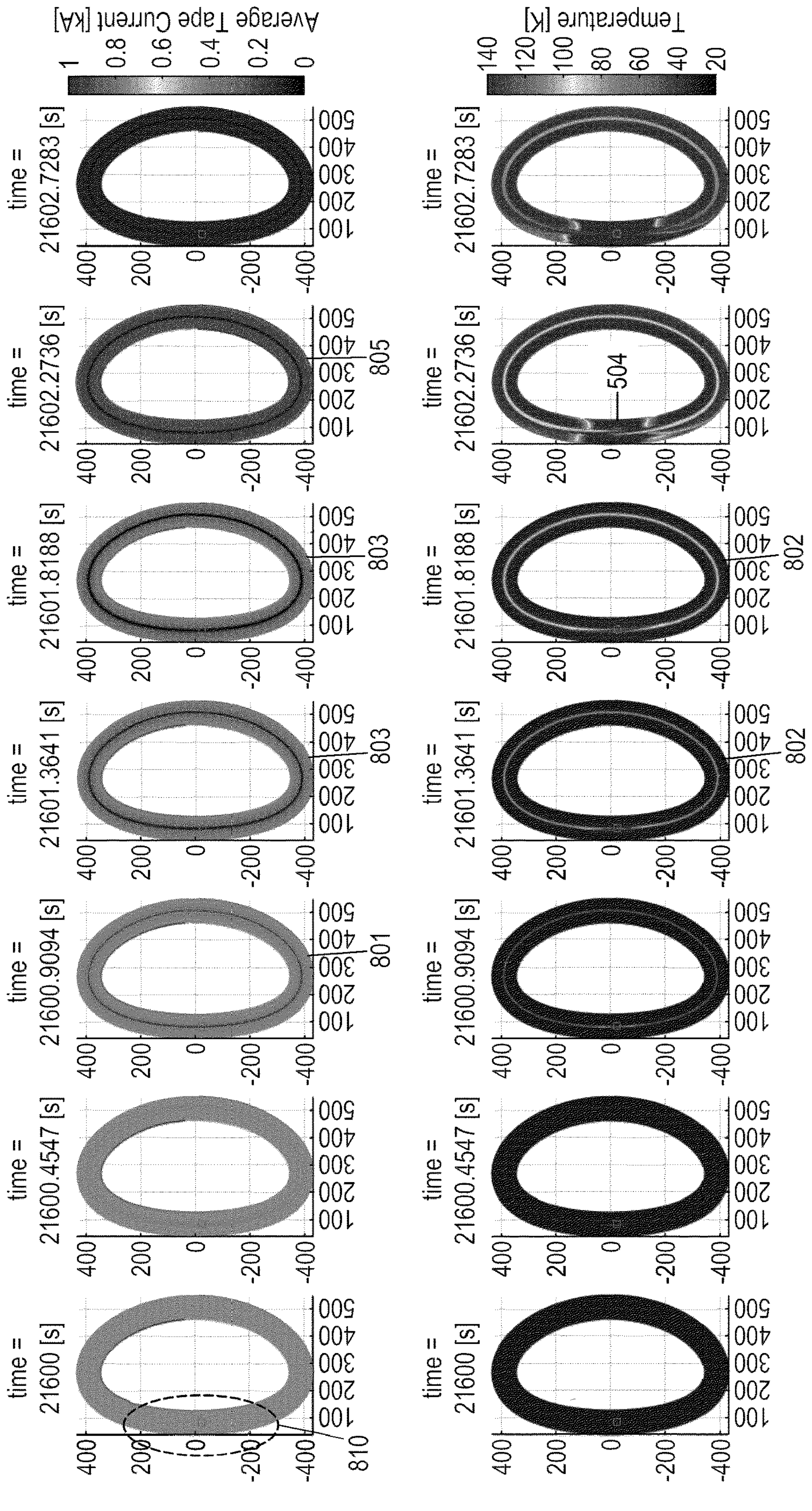
FIG. 8 shows simulation results for a partially insulated TF coil during a quench.

FIG. 8 shows simulation results for a single partially insulated D-shaped TF coil during a quench. The upper part of the figure shows the (local) average tape current in the coil at a series of timesteps (from left to right, starting at the time where a part of the coil becomes normal), and the lower part of the figure shows the temperature in the coil at the same series of timesteps. When a part of a single turn of a field coil becomes normal (or close to normal), current in that turn will quickly drop to zero 801—as it becomes more favourable for current to travel in the radial path and bypass the turn (through the partial insulation) than through the spiral path (through the HTS) of the turn. This has two effects—firstly, the temperature of the single turn and adjacent turns will begin to rise 802 due to resistive heating from the radial path, and secondly the current in the remaining turns will increase 803, due to the coil's inductance opposing the change to the magnetic field. In a symmetrical coil, the temperature increase will radiate out from the single turn, causing adjacent turns to become normal, which will then increase the current in the radial path, causing further heating, until the entire coil becomes normal. This process happens quickly, and will dissipate the stored energy substantially evenly over the field coil.

However, in an asymmetrical coil, i.e. a coil where the $I/I_C$ fraction varies around the field coil, the even redistribution of current, and initially even heating of the field coil, will not cause the field coil to heat evenly as it quenches fully. This is because regions with lower $I/I_C$ fraction, e.g. the central column 810, will quench before regions with higher $I/I_C$ fraction—simply because it is not possible for such regions to hold as much current before generating a significant resistance (and therefore heat). As such, the regions with lower $I/I_c$ fraction will become normal more quickly, eventually reaching the point where the entire cross section of the coil is resistive. At this stage, similar to the previous description of a quench in a non-insulating field coil, the resistive section of the coil will heat up rapidly 804, and the current in the spiral path with reduce rapidly 805, as the current in the spiral path dumps into the resistive section and the resistive radial path. This causes the temperature in the region with lower $I/I_c$ fraction to increase much more than the temperature of the rest of the coil, potentially resulting in damage to the coil in that section.

The simple ways to solve such issues would be to design coils such that $I/I_c$ is substantially constant around the coil (e.g. by varying the number of HTS tapes at different points in the coil), or to provide additional cooling to regions with low $I/I_c$. However, in many applications such regions arise because there is insufficient space for more HTS tapes or more cooling in that region of the HTS coil (or where increasing the space required would result in unacceptable tradeoffs). One example is in the central column of a spherical tokamak, where there is a drive to make the central column diameter as small as possible, as this increases the efficiency of the tokamak—and a large proportion of the central column is taken up by parts of the toroidal field coils.

Given the advantages of partially insulated HTS coils, and in particular partially insulated HTS coils with partially insulating layers as previously described, there is a need to find a solution to the problem of uneven quenching, without significantly increasing the thickness of the HTS coils (compared to an equivalent coil with a partially insulating layer as described in the background).

This can be achieved by providing HTS elements within the partially insulating layer, such that there is an HTS element in series with at least a proportion of the conductive paths through the partially insulating layer. The HTS elements act as current limiters for the radial path—so in regions where the coil is turning normal more quickly, the current that can be shunted through the radial path is limited (because the HTS elements are also turning normal more quickly, increasing the local resistance of the partially insulating layer). This means that more current will be shunted through the radial path in regions of the coil which are turning normal more slowly, which will increase the heating in those regions, and hence even out the rate of loss of superconductivity around the coil. This will in turn reduce the temperature of any hot spot located in a region of high $I/I_c$, as more of the energy will be dumped elsewhere in the coil.

Figure 9:
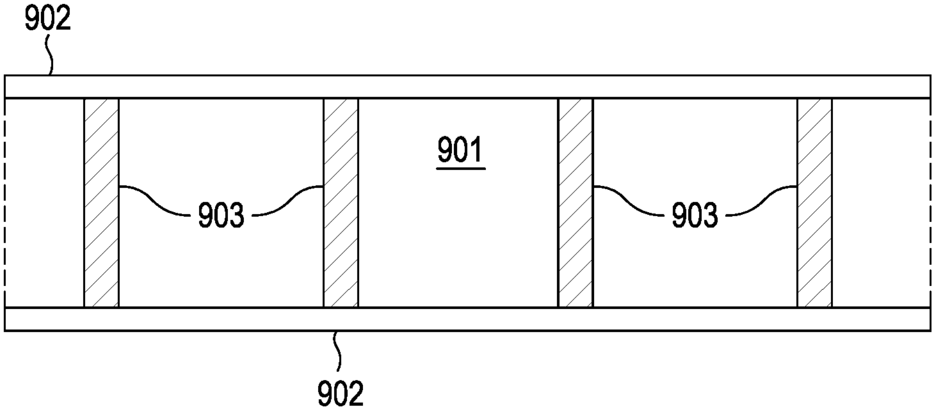
FIG. 9 is a side view cross section of an exemplary partially insulating layer.

FIG. 9 shows side view cross section of an exemplary partially insulating layer 900, which comprises an insulating body 901 (generally in the form of a long strip, for co-winding with the HTS turns, extending to the left and right as shown in the figure), metal connection layers 902, and HTS bridges 903. The HTS bridges are spaced along the insulating body (regularly in this example, though they may be more closely spaced in some regions than others), and provide an electrical connection between the metal connection layers. As described above, the HTS bridges will effectively act as current limiters, as their resistance will increase rapidly as the radial current reaches their critical current. The critical current of the HTS bridges will depend internal factors such as the properties of the HTS material and the dimensions of the HTS material (particularly the width), and on external factors such as the local temperature, local magnetic field, and strain. Determining the required critical current during operation of a coil containing the partially insulating layer can be done via simulation as is common in the field.

When the radial current per HTS bridge exceeds the critical current of the HTS bridge, the HTS bridge will become normal, with a high resistance. There may still be a path of moderate resistance (e.g. via any cladding or substrate of the HTS, via normally conducting lanes provided through the insulating body, or via other routes, e.g. through the solder if the coil is solder potted), but the overall effect will be a significant increase in the resistance of the partially insulating layer in the region where the HTS bridges have become normal. This will divert the current to other parts of the partially insulating layer, with lower resistance (causing more heating in those parts). At currents close to, but not exceeding the critical current, the resistance of the HTS bridges will increase as the current increases. As such, for a partially insulated coil with a uniformly constructed partially insulating layer, the redistribution of current will tend towards an equilibrium where both the radial current and the critical current of the HTS bridges are the same around the coil. This happens because regions with a higher critical current will have a lower resistance, which causes more current to flow through those regions, which causes additional heating, which lowers the critical current of the HTS bridges.

If a part of the coil heats up (e.g. due to a high $I/I_C$ fraction in the spiral path of that part of the coil causing a hot-spot as described above), then this will reduce the critical current of the HTS bridges in that region, diverting radial current to other parts of the coil, and in turn causing them to heat up. As such, the same effects that cause a levelling out of $I/I_C$ in the HTS bridges will also cause a levelling out of heating in the HTS turns when the field coil quenches, and hence a more even distribution of the energy dumped during a quench.

Figure 1:
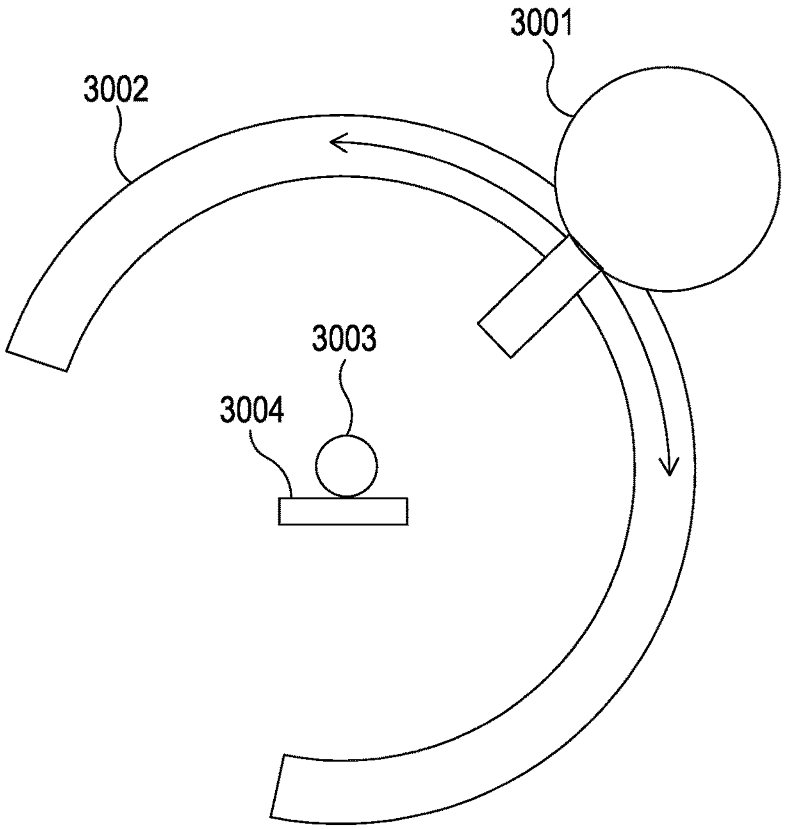
FIG. 1 illustrates a first PBT device.
Figure 2:
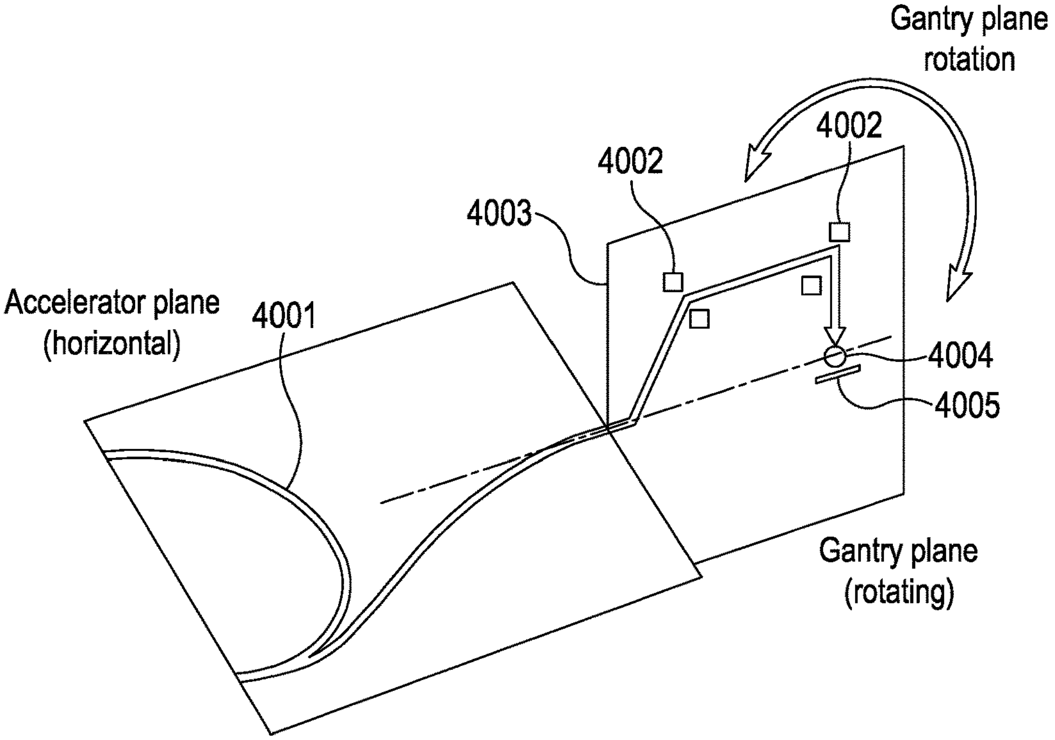
FIG. 2 illustrates a second PBT device.
Figure 3:
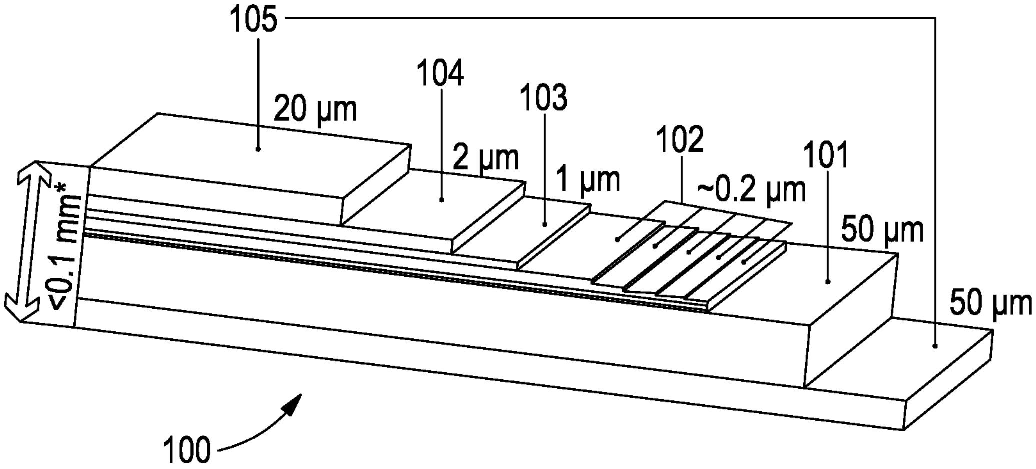
FIG. 3 illustrates the structure of ReBCO tape.
Figure 4:
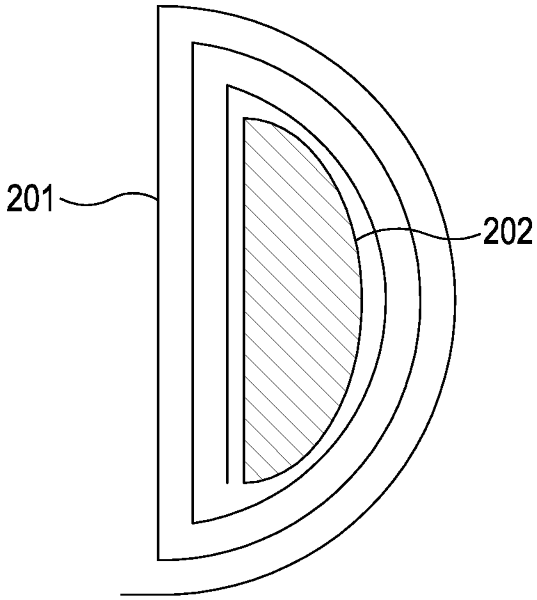
FIG. 4 is a schematic illustration of a wound coil.
Figure 5:
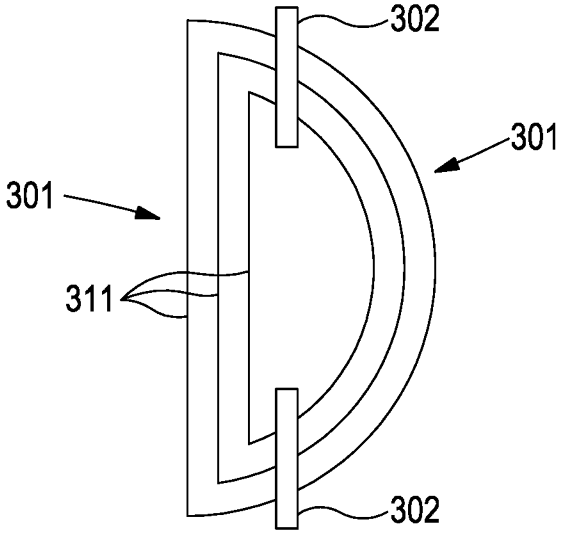
FIG. 5 is a schematic illustration of a sectional coil.
Figure 6A:
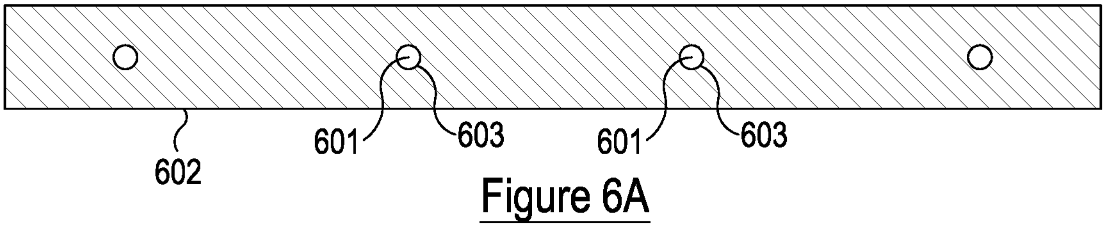
FIGS. 6A and 6B show a partially insulating layer according to WO 2019/150123 A1.
Figure 6B:
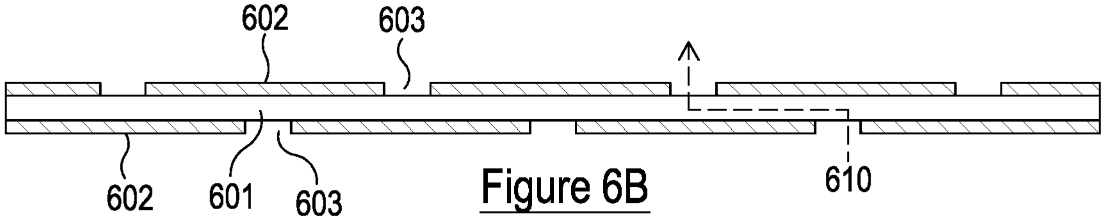
Figure 10:
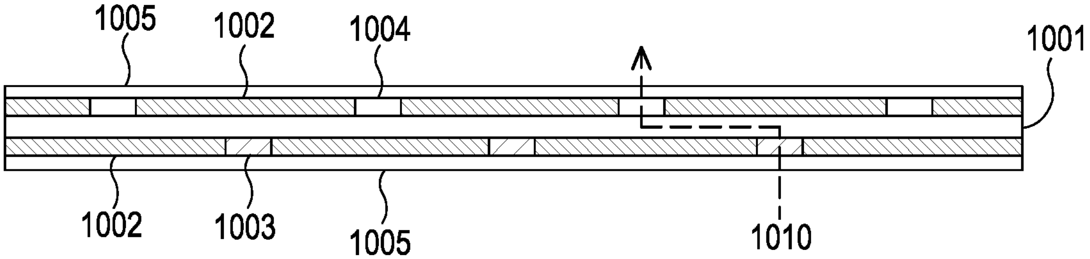
FIG. 10 is an illustration of a further exemplary partially insulating layer.

FIG. 10 shows an example partially insulating layer incorporating HTS bridges into a design similar to that of FIGS. 6A and 6B. As with FIG. 6B, the partially insulating layer includes a metal strip 1001, having an insulating layer 1002 on each side, and a plurality of windows on each side of the insulating layer, with the windows being offset from each other to provide a current path 1010 through the partially insulating layer. In this case, the partially insulating layer also comprises HTS bridges 1003 within the windows on one side, and connecting elements 1004 within the windows on the other side, which connect the metal strip to connection layers 1005.

Figure 7A:
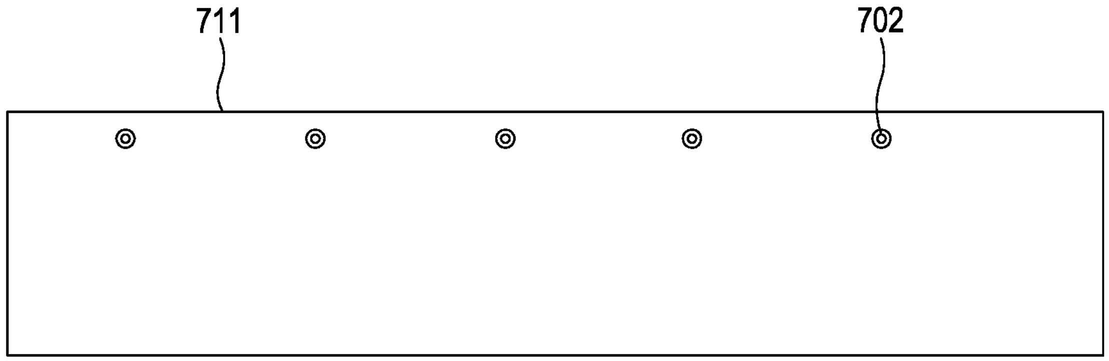
FIGS. 7A to 7C show an alternative partially insulating layer according to WO 2019/150123 A1.
Figure 7B:
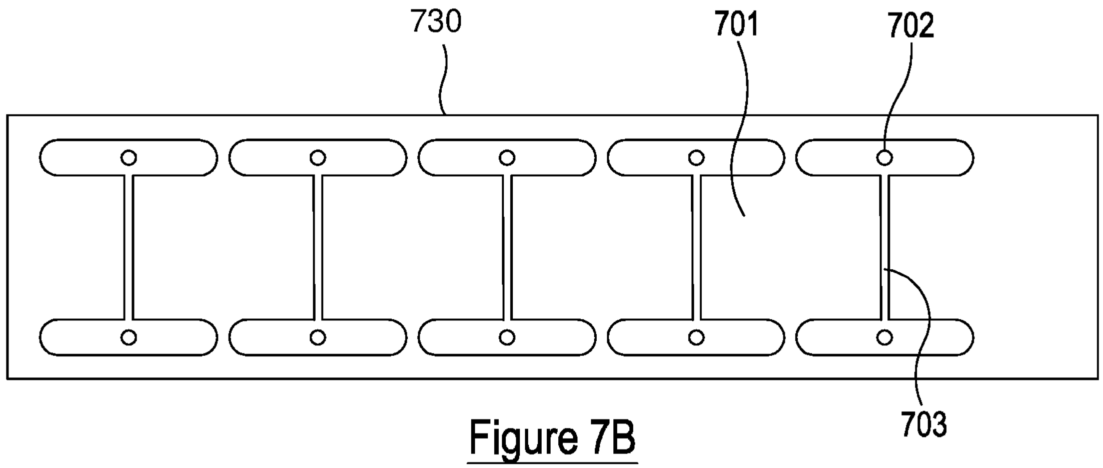
Figure 7C:
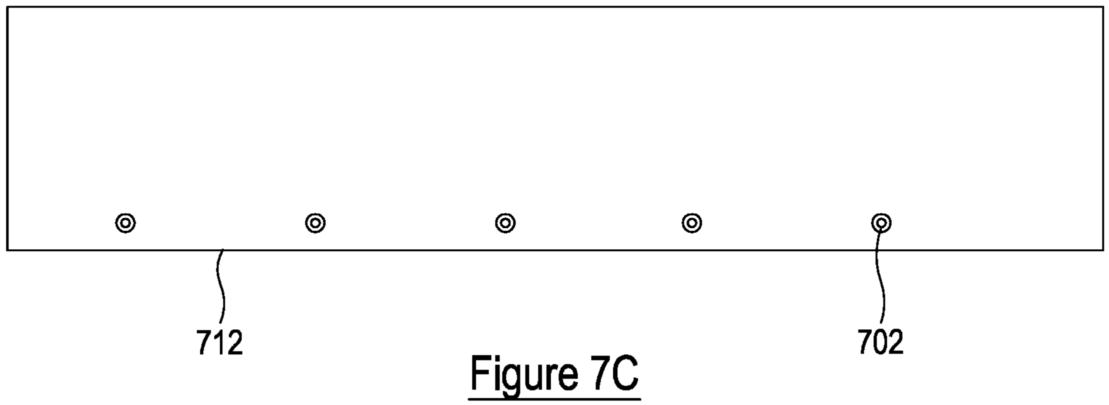

FIGS. 11A through E shows an example partially insulating layer incorporating HTS bridges into a design similar to that of FIG. 7A through 7C. The leaky insulation layer comprises 5 layers, which are, in order:

a first metal connection layer 1111;

a first insulating layer 1121;

an electrically conducting layer 1130;

a second insulating layer 1122;

a second metal connection layer 1112.

Figure 11A:
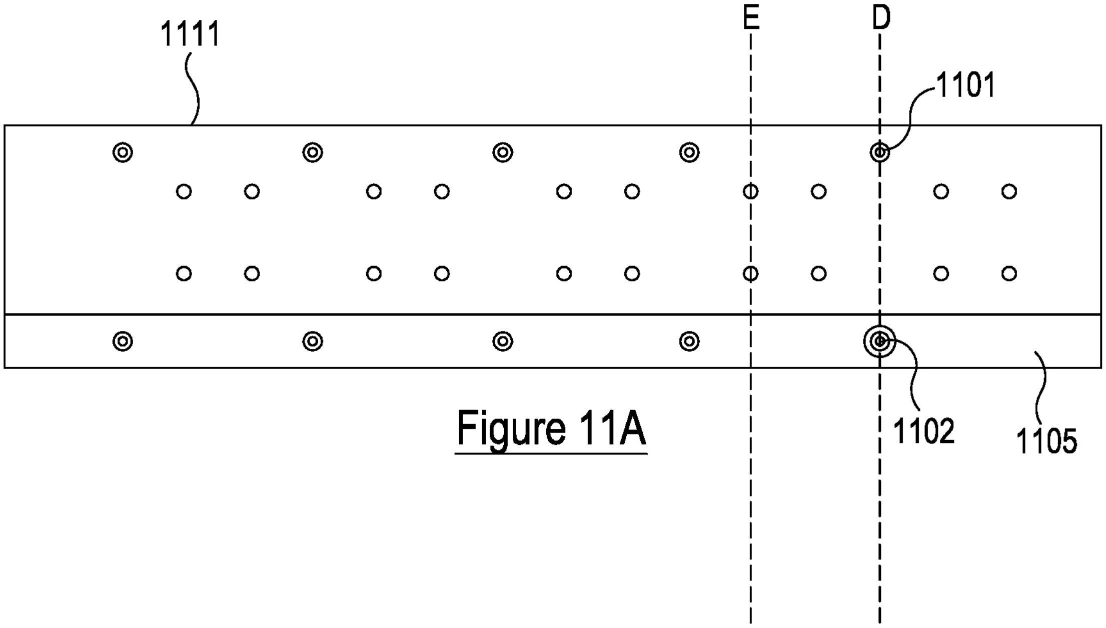
FIGS. 11A, B, C, D, and E illustrate a yet further exemplar partially insulating layer.
Figure 11B:
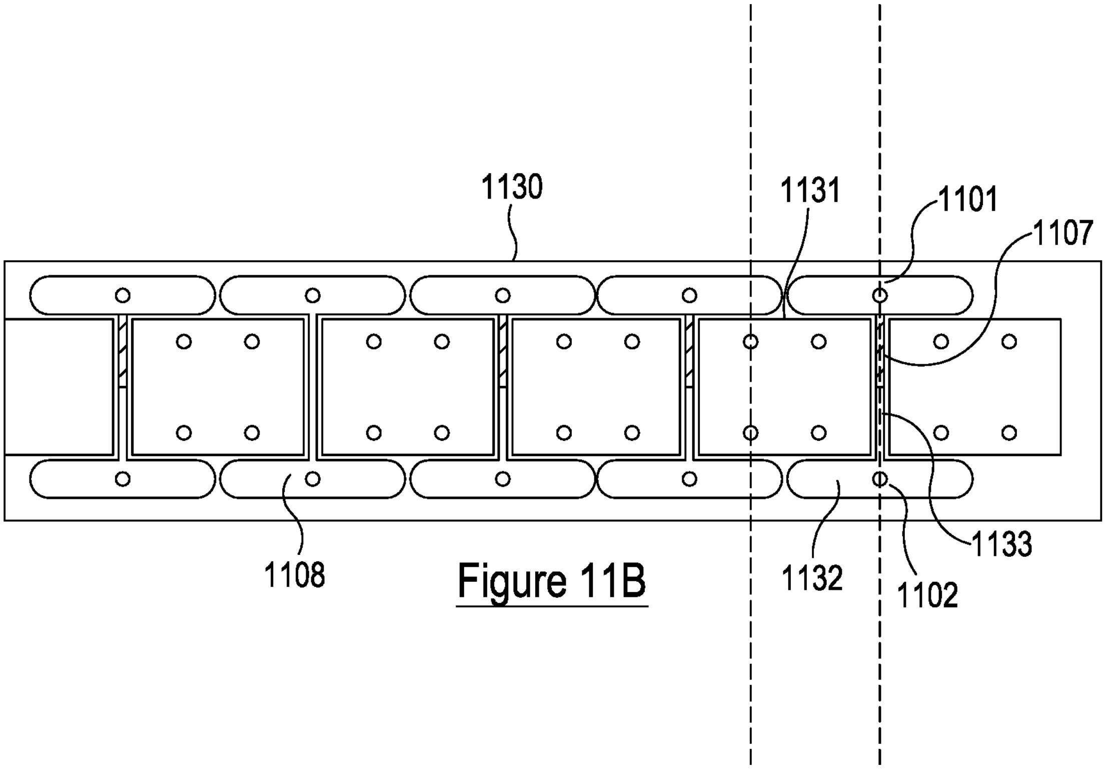
Figure 11C:
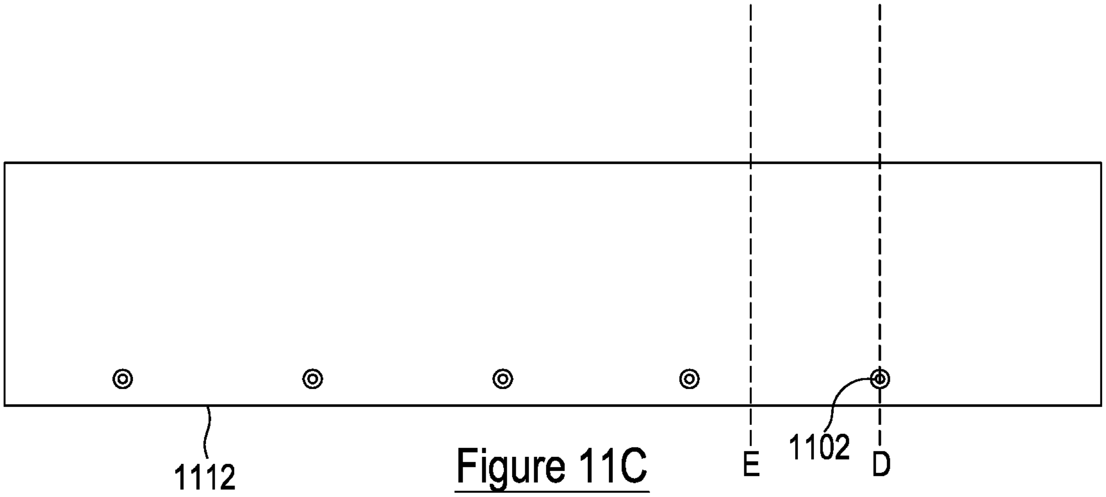
Figure 11D:
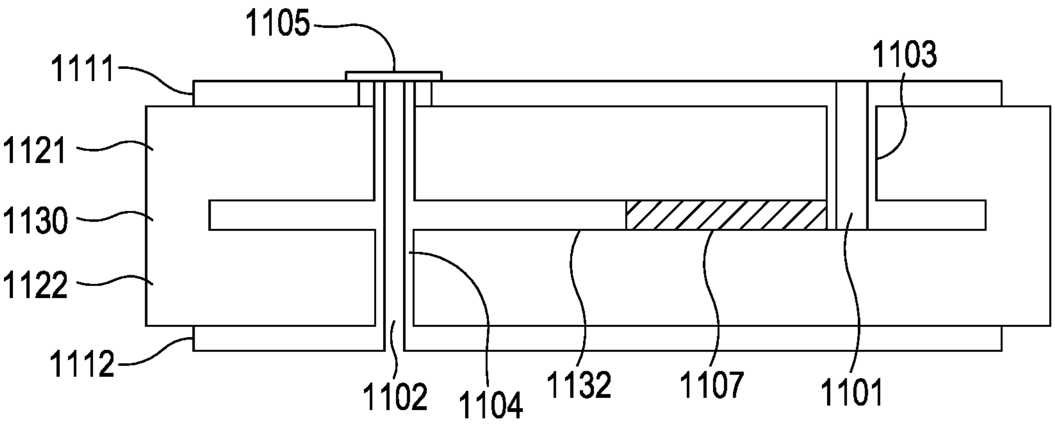
Figure 11E:
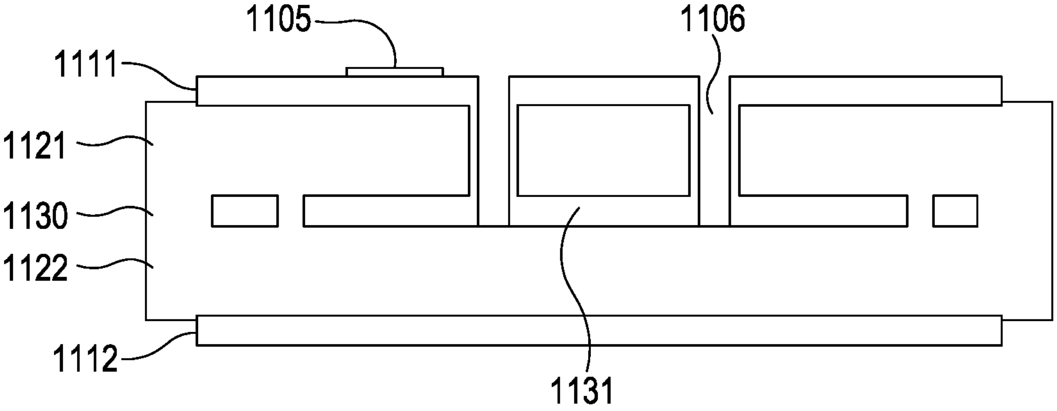

FIGS. 11A to C show the layout of the first metal connection layer 1111, electrically conducting layer 1130, and second metal connection layer 1122 respectively. FIGS. 11 D and E are cross sections along the lines D and E in FIGS. 11A to C.

The connection layers are present to facilitate attachment to HTS cables by soldering. In this and previous examples, these may be omitted, or comprise several smaller regions which allow electrical contact to be made with the electrical connections through the partially insulating layer.

The electrically conducting layer is divided into several conductive regions. These regions come in two types. The square regions 1131 (though they may be any shape in practice) are connected by vias 1106 only to one of the metal connection layers. These regions do not affect the electrical properties of the partially insulating layer, but provide a thermal path through the respective insulating layer. By varying the size of these regions and the number of connections between them and the metal connection layer, the thermal properties of the partially insulating layer can be varied independently of the electrical properties.

The other regions 1132 each connect a window 1101 of the first insulating layer 1121 to a window 1102 of the second insulating layer 1122. Each of the regions 1132 comprises an HTS bridge 1107, which is connected in series with the rest of the region. The resistance between the windows while the HTS is superconducting can be controlled by varying the geometry of the regions 1132—e.g. where the region 1132 contains a track 1133 which is elongate as shown in FIG. 11B, increasing the width of the track would reduce the resistance between the windows, and increasing the length of the track (e.g. by providing a non-linear track, or by moving the windows) would increase the resistance between windows. The radial current at which the HTS will cease superconducting can be controlled by varying the HTS material used (e.g. different ReBCO formulations or suppliers will generally have different critical currents) and/or varying the dimensions (particularly the width) of the HTS bridge.—though the critical current will also depend on external factors such as temperature and magnetic field. As previously, the required arrangement of HTS can be determined via simulation as is common in HTS magnet design.

The windows 1101 in the first insulating layer are formed by drilled vias through the first connection layer and the first insulating layer, which are then plated with metal 1103 (or other electrically conductive material) to connect the first connection layer and the electrically conductive layer. The windows 1102 in the second insulating layer are formed by drilling a via 1102 through all of the layers, which is then plated with metal 1104 (or other electrically conductive material). To prevent a connection being formed to the first connection layer through the windows 1102 of the second insulating layer, the first connection layer is etched around the via 1102 to electrically isolate it, and an insulating cap 1105 is placed on the end of the via 1102 to ensure no bridging occurs due to soldering or contact with the HTS cable.

As an alternative, the windows 1102 may instead be drilled from the other side of the partially insulating layer, such that they pass through the second connection layer, second insulating layer, and electrically conducting layer, and do not pass through (or do not pass completely through) the first insulating layer. As a further alternative, all the windows may be formed from vias which pass through all layers, with etching of the second connection layer and an insulating cap on the second connection layer being used for windows 1101 of the first insulating layer.

As with the previous examples, some of the electrical connections 1108 across the partially insulating layer may not comprise the HTS bridges (i.e. may be essentially the same as the lanes 703 of FIG. 7B), in order to further control the upper limit of the resistance of the partially insulating layer when the HTS has quenched.

Figure 12:
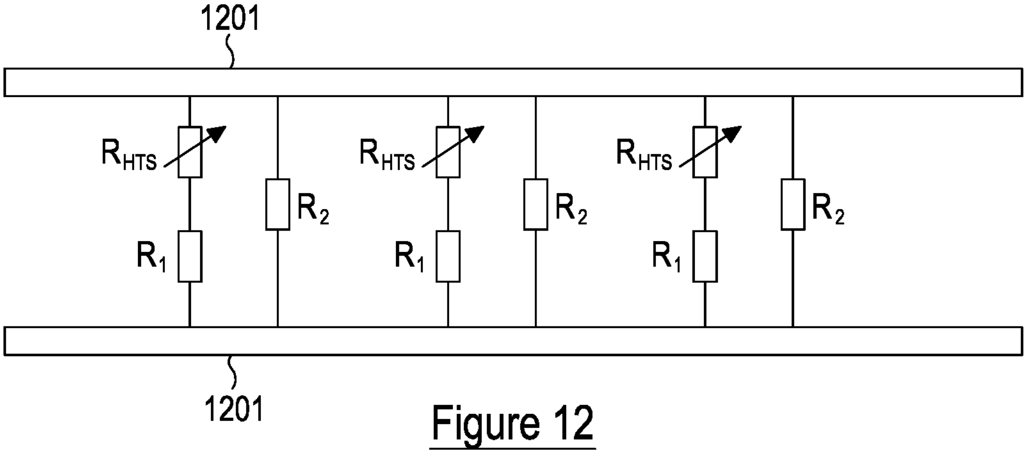
FIG. 12 is a circuit diagram of a generic exemplary partially insulating layer.

FIG. 12 shows a circuit diagram for a generic partially insulating layer of which the above description provides specific examples. The HTS coils 1201 are connected by two sets of resistances. The first set is a variable resistance $R_{HTS}$ connected in series with a resistance $R_1$. The variable resistance $R_{HTS}$ represents the resistance of the HTS bridge, and will depend on the critical current ration $I/I_C$ of the HTS (i.e. will be very low when $I/I_C$ is less than around 0.8, increase for greater $I/I_c$, and be very high when $I/I_C$ is greater than 1). R1 represents the resistance of the other conductive elements in series with the HTS bridge.

The second set of resistances is a resistance $R_2$, which represents the resistance of current paths which bypass the HTS. This may include current passing through any cladding or substrate of the HTS bridge (and through any components in series), or current paths which pass through other electrical connections through the partially insulating layer which do not comprise HTS e.g. the connection 1108 in FIG. 11B.

While the above has presented various examples of insulation within the partially insulating layer (e.g. an insulating layer as in FIG. 10, an insulating body as in FIG. 6B, or insulating layers as in FIG. 11), it will be appreciated that the unifying concept of these examples is a partially insulating layer having an "insulating region" through which a plurality of conductive paths are provided. This would also include other examples not described in detail herein, e.g. vacuum or gas gaps within the partially insulating layer, or gaps in the partially insulating layer which are later filled with epoxy (e.g. when the coil is epoxy potted).

The partially insulating layer is incorporated into an HTS field coil in such a way that it allows current to be shared radially between the turns. For example, in a wound field coil the partially insulating layer may be co-wound with the cables, and in a sectional field coil the sections may be built from alternating layers of partially insulating layers and HTS cable (or other HTS current carrying assemblies). The external electrical connections of the partially insulating layer (e.g. the metal connection layers, or the ends of the conductive paths) may be connected to the turns via solder, by simple contact, or by any other suitable method.

In a sectional coil, the partially insulating layer may or may not continue within the joints between sections—i.e. the partially insulating layer may extend all the way to the end of a section (to match up with a corresponding layer of another section at the joint), the joint may comprise an insulated region which prevents current from bypassing the partially insulating layer within the joint, or the joint may have conductor which allows current to bypass the partially insulating layer within the joint.

The HTS bridges may be distributed throughout the field coil, or may be used only in regions with high $I/I_C$ during normal operation of the magnet (with normally conductive current paths through the partial insulation being provided outside of those regions).

The HTS bridges may be made from similar HTS material to the magnet coils, or may be made from HTS material having reduced critical current and/or higher critical temperature. Providing HTS bridges with reduced critical current and/or higher critical temperature allows the characteristics of the HTS bridges to be controlled, in particular how quickly they will become normally conducting when required. The variation in critical current may be achieved by providing HTS bridges of reduced HTS cross section, e.g. reduced width, compared to the HTS material used in the magnet coils, by providing HTS bridges made from HTS material with striations or other variation in the amount and/or distribution of the HTS material compared to the magnet coils, or by providing HTS bridges made from HTS material with inherently lower critical current per unit volume. The variation in critical temperature may be achieved by providing HTS bridges made from HTS material with inherently higher critical temperature, or by controlling the oxygenation level of ReBCO HTS material used in the HTS bridges, as the oxygenation level of the ReBCO is directly related to the critical temperature.

The invention claimed is:

1. A high temperature superconducting, HTS, field coil, the HTS field coil comprising:
- a plurality of turns comprising HTS material and metallic stabilizer;
- a partially insulating layer separating the turns, such that current can be shared between turns via the partially insulating layer;
- the partially insulating layer comprising:
  - an insulating region,
  - a plurality of electrically conductive paths through the insulating region, wherein current can be shared between the turns via the electrically conductive paths;
  - each electrically conductive path comprising an HTS bridge comprising HTS material, wherein the HTS bridge is in series with normally conducting material of the electrically conductive path.

2. An HTS field coil according to claim 1, wherein each HTS bridge comprises a metal stabiliser and/or substrate bonded to the HTS material and connected in parallel with the HTS material.

3. An HTS field coil according to claim 1, wherein the electrically conductive paths are evenly spaced along the partially insulating layer.

4. An HTS field coil according to claim 1, wherein the partially insulating layer further comprises a plurality of further electrically conductive paths through the insulating region, wherein current can also be shared between turns via the further electrically conductive paths, wherein the further electrically conductive paths do not comprise HTS material.

5. An HTS field coil according to claim 4, wherein the electrically conductive paths comprising HTS bridges are provided within a first region of the HTS field coil, and the further electrically conductive paths are provided at least outside of the first region of the HTS field coil, wherein the first region of the HTS field coil is a region where a ratio $I/I_c$ between operating current of the HTS field coil and critical current of each turn of the HTS field coil during operation of the HTS field coil is higher than said ratio outside of the first region.

6. An HTS field coil according to claim 1, wherein the HTS material of the HTS bridges has a lower critical current and/or a greater critical temperature than the HTS material of the plurality of turns.

* * * * *